(12) United States Patent
Hashimura

(10) Patent No.: US 6,316,894 B2
(45) Date of Patent: *Nov. 13, 2001

(54) DRIVING DEVICE FOR THREE-PHASE BRUSHLESS MOTOR

(75) Inventor: Tomohide Hashimura, Kyoto (JP)

(73) Assignee: Rohm Co., Ltd., Kyoto (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/355,985

(22) PCT Filed: Feb. 18, 1998

(86) PCT No.: PCT/JP98/00698

§ 371 Date: Aug. 23, 1999

§ 102(e) Date: Aug. 23, 1999

(87) PCT Pub. No.: WO98/37621

PCT Pub. Date: Aug. 27, 1998

(30) Foreign Application Priority Data

Feb. 24, 1997 (JP) .................................................. 9-038702

(51) Int. Cl.[7] ............................................... H02P 6/18
(52) U.S. Cl. ......................................... 318/439; 318/254
(58) Field of Search ............................ 318/138, 254, 318/439, 700, 720, 721, 722, 724

(56) References Cited

U.S. PATENT DOCUMENTS

| 5,221,881 | * | 6/1993 | Cameron | 318/254 |
| 5,306,988 | * | 4/1994 | Carobolante et al. | 318/254 |
| 5,451,832 | * | 9/1995 | Cameron et al. | 318/375 |
| 5,517,095 | * | 5/1996 | Carobolante et al. | 318/254 |
| 5,616,996 | * | 4/1997 | Tang et al. | 318/439 |
| 5,866,998 | * | 2/1999 | Menegoli | 318/254 |

FOREIGN PATENT DOCUMENTS

| 6-62593 | 3/1994 | (JP) . |
| 8-33382 | 2/1996 | (JP) . |
| 8-182379 | 7/1996 | (JP) . |
| 8-251978 | 9/1996 | (JP) . |

* cited by examiner

*Primary Examiner*—Bentsu Ro
(74) *Attorney, Agent, or Firm*—Arent Fox Kintner Plotkin & Kahn PLLC

(57) ABSTRACT

A driving device for a three-phase brushless motor offers stable rotation characteristics even in case of polarity inversion resulting from braking applied, noise appearing, or other factors arising during rotation of the motor. The driving device has a comparator circuit for comparing the back electromotive forces appearing in the motor individually with the common-terminal voltage to output square-wave signals, a synthesizing circuit for producing drive signals, a circuit for producing from the square-wave signals a speed signal and then shifting the phase thereof to produce a phase signal, and a current supply circuit for supplying drive currents to the motor in accordance with the drive signals and the phase signal. The driving device further has a selector circuit for feeding a select signal back to the gate circuits provided in the stage subsequent to the comparator to perform masking.

3 Claims, 5 Drawing Sheets

DRIVING DEVICE FOR THREE-PHASE BRUSHLESS MOTOR

TECHNICAL FIELD

The present invention relates to a driving device for a three-phase brushless motor used to rotate a head in, for example, a portable MD (MiniDisk) apparatus or a VCR (videocassette recorder).

BACKGROUND ART

In a conventional driving device for a three-phase brushless motor, the back electromotive forces $V_U$, $V_V$, and $V_W$ appearing in the coils of the motor are individually compared with the common-terminal voltage $V_N$ of the coils by a comparator to obtain three-phase square-wave signals $P_U$, $P_V$, and $P_W$, which are then directly synthesized together to produce a speed signal (hereafter referred to as an "FG (frequency generator) signal") and drive signals $D_{UU}$, $D_{UL}$, $D_{VU}$, $D_{VL}$, $D_{WU}$, and $D_{WL}$.

The FG signal is then subjected to 30-degree phase shifting performed by a phase shifting circuit so as to be converted into a phase signal FGP. In accordance with this phase signal FGP and the above-mentioned drive signals $D_{UU}$, $D_{UL}$, $D_{VU}$, $D_{VL}$, $D_{WU}$, and $D_{WL}$, drive currents are supplied from a current supply circuit such as a power transistor circuit to the three-phase brushless motor.

However, in this conventional driving device, as long as the motor is rotating stably, the square-wave signals $P_U$, $P_V$, and $P_W$ exhibit stable waveforms as shown in FIG. 6; however, as shown in FIG. 7, when irregular variations occur in the back electromotive forces $V_U$, $V_V$, and $V_W$ as a result of polarity inversion caused by braking applied as in the period T, or by noise appearing as indicated by reference numerals 40 and 41, or by other factors, the square-wave signals $P_U$, $P_V$, and $P_W$ exhibit irregular variations accordingly.

Thus, the FG signal and the drive signals $D_{UU}$, $D_{UL}$, $D_{VU}$, $D_{VL}$, $D_{WU}$, and $D_{WL}$, which are produced from the square-wave signals $P_U$, $P_V$, and $P_W$, are also affected such that the FG signal is no longer usable if left intact and that the drive signals $D_{UU}$, $D_{UL}$, $D_{VU}$, $D_{VL}$, $D_{WU}$, and $D_{WL}$ cause unstable rotation of the motor, making it impossible to obtain stable rotation characteristics. Note that, in FIGS. 6 and 7, only the drive signals $D_{UU}$, and $D_{UL}$, are shown, and the other drive signals $D_{VU}$, $D_{VL}$, $D_{UU}$, and $D_{VL}$ are omitted.

DISCLOSURE OF THE INVENTION

An object of the present invention is to provide a driving device for a three-phase brushless motor that offers stable rotation characteristics by preventing an FG signal and drive signals from being affected by polarity inversion resulting from braking applied, noise appearing, or other factors arising during rotation of the motor.

To achieve the above object, according to one aspect of the present invention, in a three-phase brushless motor driving device for supplying a three-phase brushless motor with three-phase drive currents that differ in phase by 120 degrees from one another, passage control means is provided that compares the back electromotive forces appearing in three coils provided one for each phase in the three-phase brushless motor individually with the common-terminal voltage of the three coils and that controls the resulting comparison outputs individually in such a way that each of the comparison outputs is, in a predetermined period including a level-shift point thereof, permitted to pass through intact and is, in a period between one such predetermined period and a next such predetermined period, kept at a level at which it is set after the level-shift point, and the drive currents are produced by current supply means in accordance with the signals resulting from passage control.

According to this configuration, in the predetermined period, the driving device, by means of gate circuits or the like, allows passage of the comparison outputs obtained by comparison of the back electromotive forces with the common-terminal voltage so that the level-shift points of the individual comparison outputs are detected. In the period between this predetermined period and the next such predetermined period, the passage control means keeps the comparison outputs at their levels at which they are set after the level-shift points. In accordance with the signals resulting from such passage control, the driving device supplies three-phase drive currents from the current supply means, employing power transistors or the like, to the three-phase brushless motor. As a result, a rotating magnetic field appears in each coil provided in the three-phase brushless motor, and thus the rotor of the motor rotates.

According to another aspect of the present invention, a three-phase brushless motor driving device for supplying a three-phase brushless motor with drive currents is provided with: a comparator circuit for comparing the back electromotive forces appearing in three coils provided one for each phase in the three-phase brushless motor individually with the common-terminal voltage of the three coils to produce square-wave signals; gate circuits for controlling passage of the square-wave signals individually; a drive waveform synthesizing circuit for synthesizing together the outputs of the gate circuits to produce drive signals; an FG circuit for producing a speed signal from the outputs of the gate circuits; a phase shifting circuit for producing from the speed signal a phase signal having a phase shifted by 30 degrees relative to the speed signal; a current supply circuit for supplying the drive currents to the three-phase brushless motor in accordance with the drive signals and the phase signal; and a selector circuit for feeding a select signal back to the gate circuits in accordance with the drive signals and the phase signal. Here, the gate circuits allow passage of the square-wave signals individually only in a predetermined period.

According to this configuration, the driving device, by means of the comparator circuit, compares the back electromotive forces appearing in the motor coils with the common-terminal voltage to produce square-wave signals, and then synthesizes the square-wave signals together to produce drive signals and a phase signal. In accordance with the drive signals and the phase signal, drive currents are supplied from the current supply circuit to the three-phase brushless motor to drive it.

Moreover, in accordance with the drive signals and the phase signal, the selector circuit produces a select signal, and feeds it back to the gate circuits inserted in the stage subsequent to the comparator circuit. This makes it possible to perform masking in the periods other than the periods in which the rotor position of the motor is detected. In this way, it is possible to prevent the drive signals and the phase signal from being affected by irregular variations in the back electromotive forces resulting from braking or noise.

BEST MODE FOR CARRYING OUT THE INVENTION

Figure 1:
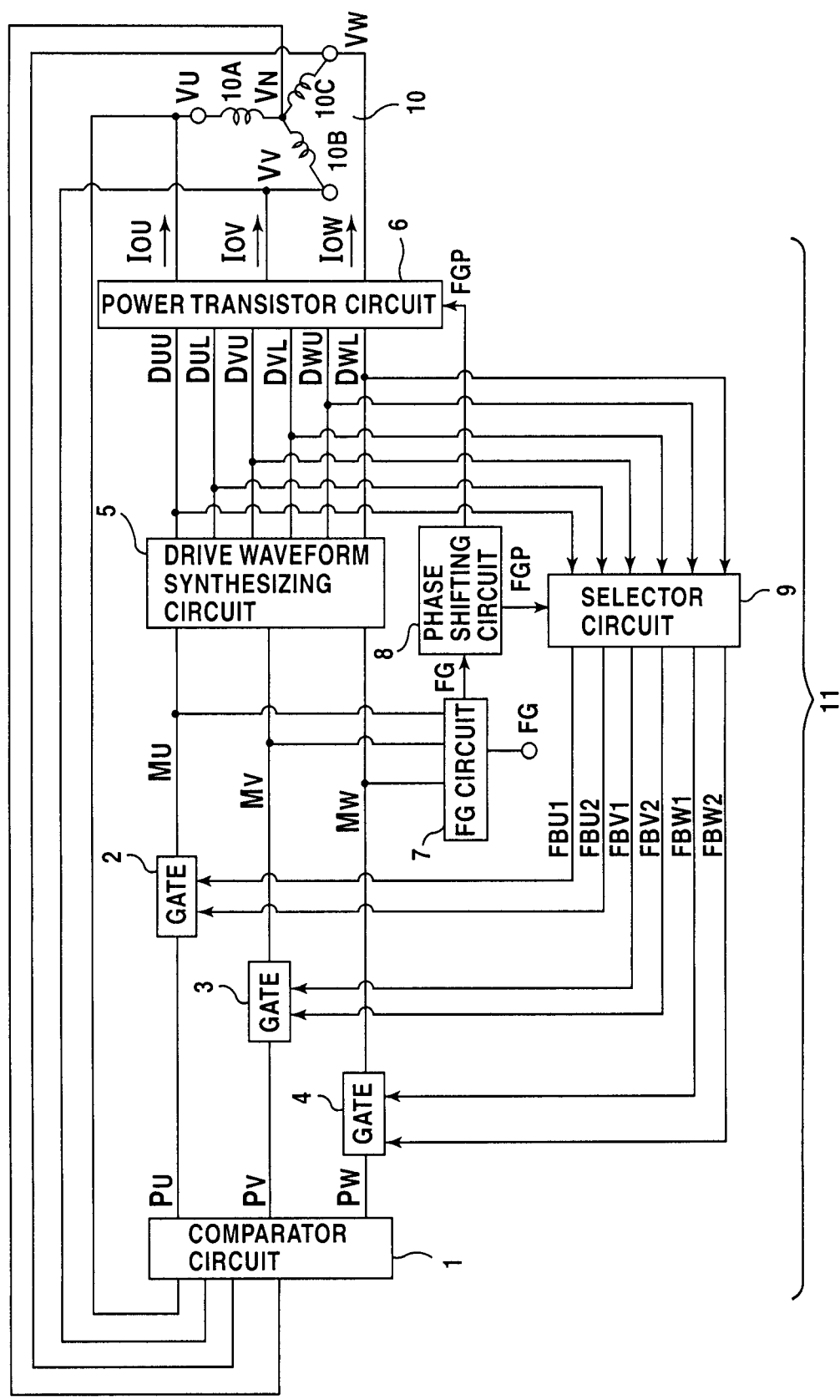
FIG. 1 is a block diagram of an embodiment of the present invention.

Hereinafter, an embodiment of the present invention will be described with reference to FIGS. 1 to 5. FIG. 1 is a block diagram showing the configuration of this embodiment. A driving device 11 drives a three-phase brushless motor 10 by supplying it with drive currents $I_{OU}$, $I_{OV}$, and $I_{OW}$. The driving device is formed, for example, as an IC (integrated circuit).

Figure 4:
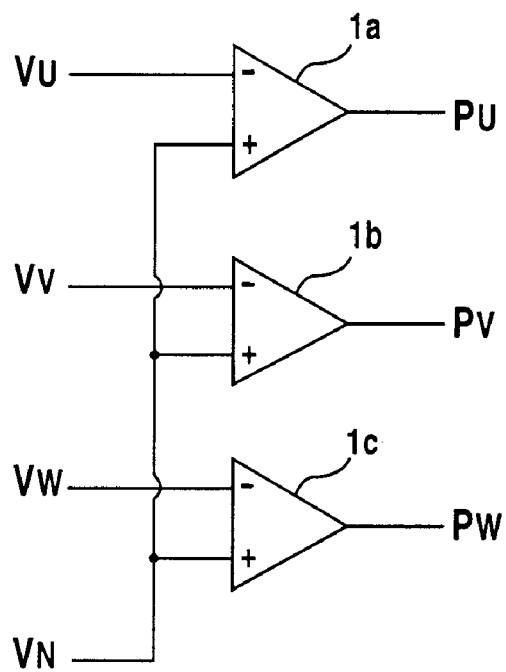
FIG. 4 is a diagram showing the configuration of the comparator circuit employed in the device shown in FIG. 1.

The motor 10 is provided with coils 10A, 10B, and 10C for the U, V, and W phases, respectively. These coils 10A, 10B, and 10C are arranged at such intervals that their phases differ by 120 degrees from one another. The back electromotive forces $V_U$, $V_V$, and $V_W$ appearing in the coils 10A, 10B, and 10C, respectively, are, together with the common-terminal voltage $V_N$, fed to the driving device 11 so as to be individually subjected to comparison performed by comparators in a comparator circuit 1. The comparator circuit 1 outputs, as the results of comparison, square-wave signals $P_U$, $P_V$, and $P_W$. As shown in FIG. 4, the comparator circuit 1 is composed of three comparators 1a, 1b, and 1c. The square-wave signals $P_U$, $P_V$, and $P_W$ are then subjected to passage control performed by gate circuits 2, 3, and 4, and are thereby output as inverted signals $M_U$, $M_V$, and $M_W$.

Next, in a drive waveform synthesizing circuit 5, the signals $M_U$, $M_V$, and $M_W$ are synthesized together to produce drive signals $D_{UU}$, $D_{UL}$, $D_{VU}$, $D_{VL}$, $D_{WU}$ and $D_{WL}$. For example, the signal $D_{UU}$ is so synthesized as to rise at a rising edge of the signal $M_U$ and fall at a rising edge of the signal $M_V$. The other signals $D_{UL}$, $D_{VU}$, $D_{VL}$, $D_{WU}$, and $D_{WL}$ are synthesized in a similar manner from the signals $M_U$, $M_V$, and $M_W$. The signals $D_{UU}$, $D_{VU}$, and $D_{WU}$ differ in phase by 120 degrees from one another. Similarly, the signals $D_{UL}$, $D_{VL}$, and $D_{WL}$ differ in phase by 120 degrees from one another.

In an FG circuit 7, the exclusive-OR value of the signals $M_U$, $M_V$, and $M_W$ is calculated by means of an exclusive-OR gate, and then the NOT value of the thus calculated value is calculated to produce an FG signal (described later). Then, in a phase shifting circuit 8, the FG signal is subjected to 30-degree phase shifting so as to be formed into a phase signal FGP. The phase shifting circuit 8 is composed of, for example, a delay circuit.

In a power transistor circuit 6, power transistors are turned on and off in accordance with the drive signals $D_{UU}$, $D_{UL}$, $D_{VU}$, $D_{VL}$, $D_{WU}$, and $D_{WL}$ and the phase signal FGP, and thereby drive currents $I_{OU}$, $I_{OV}$, and $I_{OW}$ having a regular cycle are produced. The drive currents $I_{OU}$, $I_{OV}$, and $I_{OW}$ are supplied to the motor coils 10A, 10B, and 10C, respectively. The power transistor circuit 6 serves as a current supply circuit.

Figure 5:
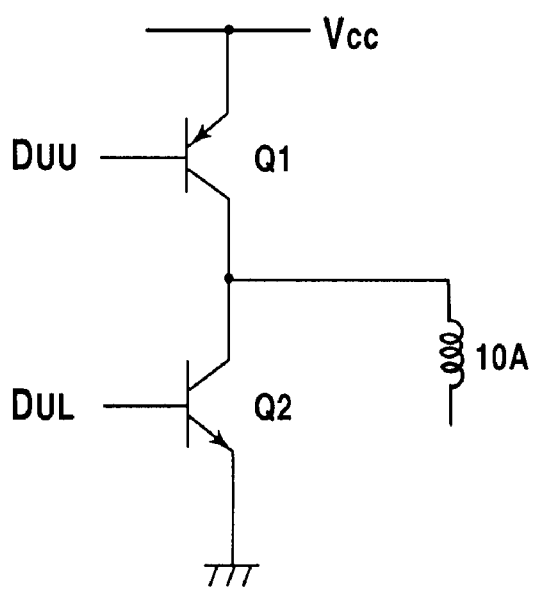
FIG. 5 is a circuit diagram showing a part of the power transistor circuit employed in the device shown in FIG. 1.
Figure 6:
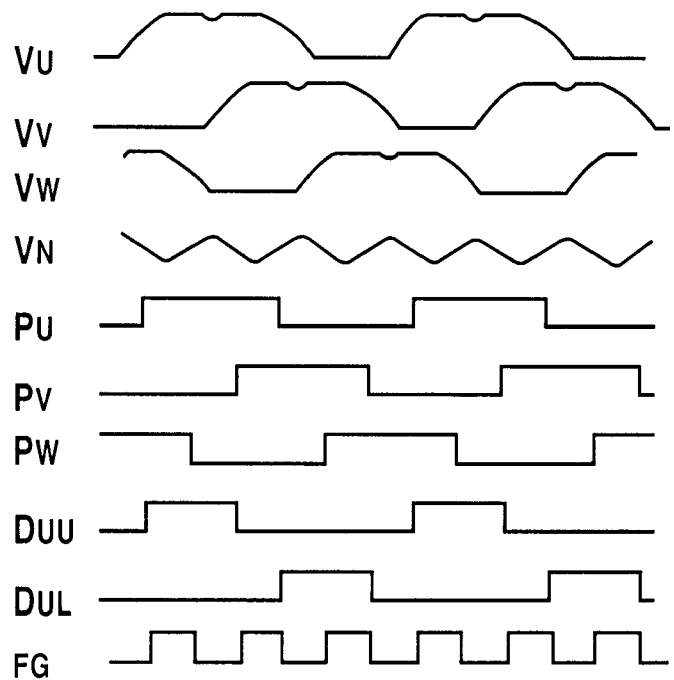
FIG. 6 is a waveform diagram of the signals observed at various points in a conventional driving device.
Figure 7:
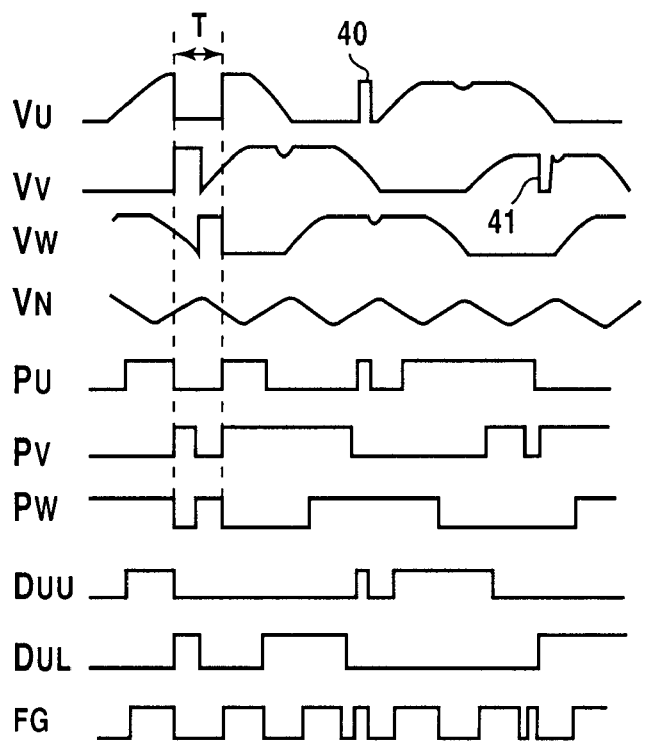
FIG. 7 is a waveform diagram illustrating how signals are affected by braking and noise therein.

For example, to produce the drive signal $I_{OU}$, a pnp-type transistor Q1 and an pnp-type transistor Q2 are connected together as shown in FIG. 5 so that, when the signal $D_{UU}$ is at a high level, the transistor Q1 is turned on to cause a current to flow from the direct-current supplied voltage Vcc through the transistor Q1 to the coil 10A and, when $D_{UL}$ is at a high level, the transistor Q2 is turned on to cause a current to flow from the coil 10A to ground. Note however that, in the power transistor circuit 6, the phase signal FGP is used as a timing signal for switching the drive signal $I_{OU}$, and therefore the drive signal $I_{OU}$ shows a 30-degree phase difference relative to the level shifts in the drive signals $D_{UU}$ and $D_{UL}$. The drive currents $I_{OV}$ and $I_{OW}$ are output in a similar manner. The thus obtained drive currents $I_{OU}$, $I_{OV}$, and $I_{OW}$ differ in phase by 120 degrees from one another.

In a selector circuit 9, as will be described later, the drive signals $D_{UU}$, $D_{UL}$, $D_{VU}$, $D_{VL}$, $D_{WU}$, and $D_{WL}$ are switched in accordance with whether the FGP signal is at a high level or at a low level to produce select signals FBU1, FBU2, FBV1, FBV2, FBW1, and FBW2. The select signals FBU1, FBU2, FBV1, FBV2, FBW1, and FBW2 are fed back to the gate circuits 2, 3, and 4, where they are used to control passage of the square-wave signals $P_U$, $P_V$, and $P_W$. The gate circuits 2, 3, and 4 and the selector circuit 9 together constitute what will hereafter be referred to as the masking circuit. The comparator circuit 1, the gate circuits 2, 3, and 4, the drive waveform synthesizing circuit 5, the FG circuit 7, the phase shifting circuit 8, and the selector circuit 9 together constitute a passage control means.

Figure 2:
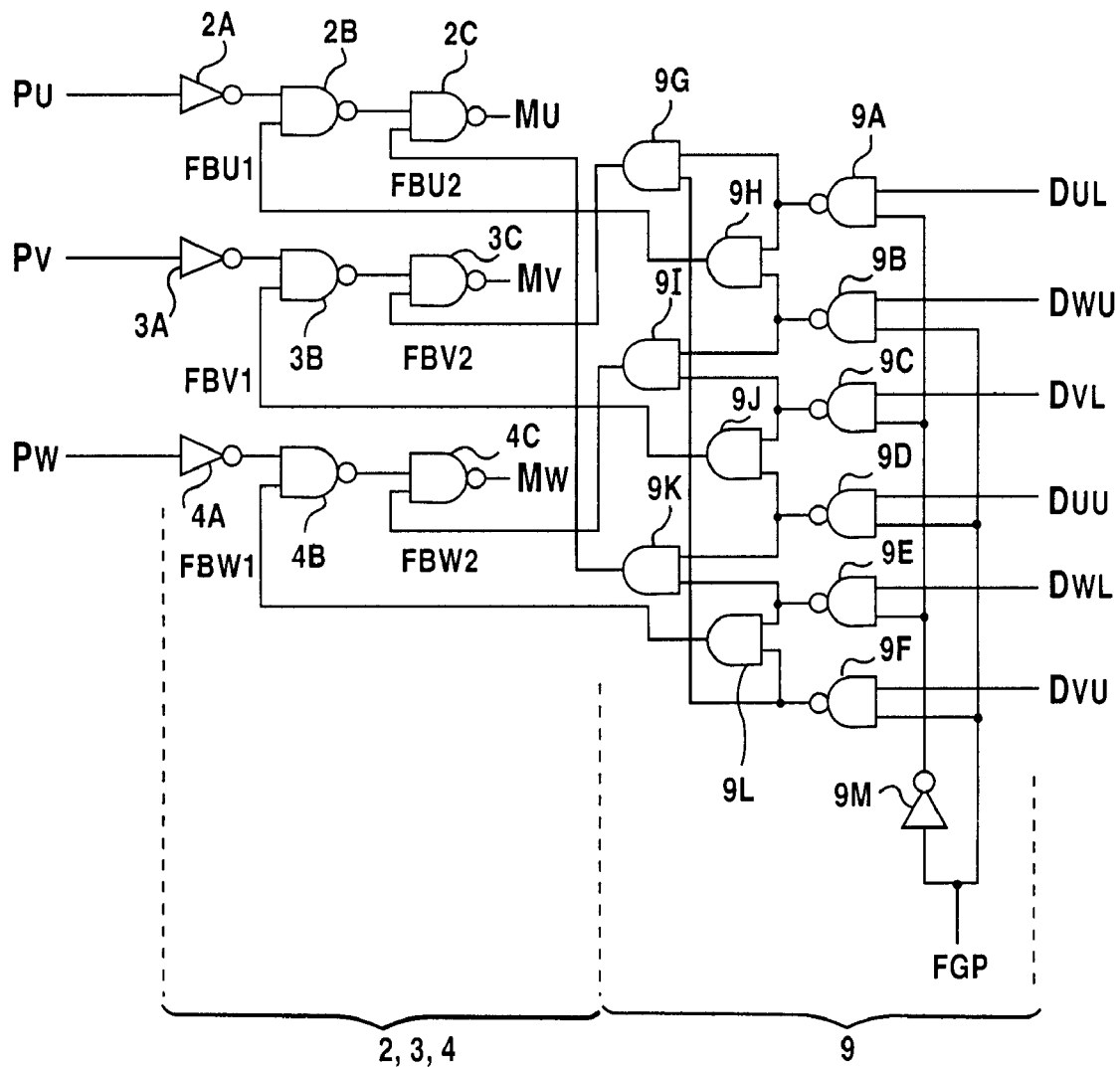
FIG. 2 is a circuit diagram of the gate circuits and the selector circuit employed therein.

The detailed configuration of the masking circuit is shown in FIG. 2. The phase signal FGP fed to the selector circuit 9 is subjected to level inversion by a NOT gate (inverter) 9M. The drive signal $D_{UL}$, and the signal output from the NOT gate 9M are fed to a NAND gate 9A. The drive signal $D_{WU}$ and the phase signal FGP are fed to a NAND gate 9B.

The drive signal $D_{VL}$ and the signal output from the NOT gate 9M are fed to a NAND gate 9C. The drive signal $D_{UU}$ and the phase signal FGP are fed to a NAND gate 9D. The drive signal $D_{WL}$ and the signal output from the NOT gate 9M are fed to a NAND gate 9E. The drive signal $D_{VU}$ and the phase signal FGP are fed to a NAND gate 9F.

An AND gate 9G calculates the AND value of the signals output from the NAND gates 9A and 9F, and thereby outputs the signal FBV2. An AND gate 9H calculates the AND value of the signals output from the NAND gates 9A and 9B, and thereby outputs the signal FBU1. An AND gate 9I calculates the AND value of the signals output from the NAND gates 9B and 9C, and thereby outputs the signal FBW2.

An AND gate 9J calculates the AND value of the signals output from the NAND gates 9C and 9D, and thereby outputs the signal FBV1. An AND gate 9K calculates the AND value of the signals output from the NAND gates 9D and 9E, and thereby outputs the signal FBU2. An AND gate 9L calculates the AND value of the signals output from the NAND gates 9E and 9F, and thereby outputs the signal FBW1.

In the gate circuit 2, a NOT gate 2A inverts the level of the square-wave signal $P_U$. Then, a NAND gate 2B calculates the NAND value of the signal output from the NOT gate 2A and the signal FBU1 fed from the selector circuit 9. Then, a NAND gate 2C calculates the NAND value of the signal output from the NAND gate 2B and the signal FBU2. Thus, the gate circuit 2 outputs the signal $M_U$.

In the gate circuit 3, a NOT gate 3A inverts the level of the square-wave signal $P_V$. Then, a NAND gate 3B calculates the NAND value of the signal output from the NOT gate 3A and the select signal FBV1. Then, a NAND gate 3C calculates the NAND value of the signal output from the NAND gate 3B and the signal FBV2. Thus, the gate circuit 3 outputs the signal $M_V$.

In the gate circuit 4, a NOT gate 4A inverts the level of the square-wave signal $P_W$. Then, a NAND gate 4B calculates the NAND value of the signal output from the NOT gate 4A and the select signal FBW1. Then, a NAND gate 4C calculates the NAND value of the signal output from the NAND gate 4B and the signal FBW2. Thus, the gate circuit 4 outputs the signal $M_W$.

Now, how driving of the motor 10 (see FIG. 1) is achieved will be described with reference to FIG. 3, which shows the waveforms of the signals observed at various points in the driving device when the motor 10 rotates. In the motor coils 10A, 10B, and 10C, the back electromotive forces $V_U$, $V_V$, and $V_W$ are induced to appear repeatedly with a regular cycle by the drive currents $I_{OU}$, $I_{OV}$, and $I_{OW}$. Here, the back electromotive forces $V_U$, $V_V$, and $V_W$ differ in phase by 120 degrees from one another. On the other hand, the common-terminal voltage $V_N$ varies with one third of the cycle of the back electromotive forces $V_U$, $V_V$, and $V_W$ as long as the motor 10 is rotating normally.

As described previously, in the comparator circuit 1, the back electromotive forces $V_U$, $V_V$, and $V_W$ are individually compared with the common-terminal voltage $V_N$ to obtain three-phase square-wave signals $P_U$, $P_V$, and $P_W$. If inversion occurs in the waveforms of the back electromotive forces $V_U$, $V_V$, and $V_W$ as a result of phase inversion as caused by braking as indicated by reference numerals 21 and 22, irregular variations occur in the square-wave signals $P_U$, $P_V$, and $P_W$ as indicated by reference numerals 23 and 24.

If these square-wave signals $P_U$, $P_V$, and $P_W$ are fed directly to the drive waveform synthesizing circuit 5 as in the conventional driving device described earlier, it is impossible to drive the motor 10 normally. By contrast, in this embodiment, where the gate circuits 2, 3, and 4 are inserted in the stage subsequent to the comparator circuit 1 to perform masking on the square-wave signals $P_U$, $P_V$, and $P_W$ and thereby form them into the signals $M_U$, $M_V$, and $M_W$, it is possible to drive the motor 10 normally.

Here, when the phase signal FGP is at a high level, the selector circuit 9 (see FIG. 2) feeds $\overline{D_{WU}}$ as the signal FBU1 to the NAND gate 2B, and feeds $\overline{D_{UU}}$ as the signal FBU2 to the NAND gate 2C. By contrast, when the phase signal FGP is at a low level, the selector circuit 9 feeds $\overline{D_{UL}}$ to the NAND gate 2B, and feeds $\overline{D_{WL}}$ to the NAND gate 2C.

The signals FBU1 and FBU2 have the following relationship. When the signal FBU1 is at a low level, the signal FBU2 is at a high level. When the signal FBU2 is at a low level, the signal FBU1 is at a high level. The signals FBU1 and FBU2 are never at a low level simultaneously.

Thus, when the signal FBU1 is at a low level, the signal $M_U$ is invariably at a low level irrespective of the level of the square-wave signal $P_U$. By contrast, when the signal FBU2 is at a low level, the signal $M_U$ is invariably at a high level irrespective of the level of the square-wave signal $P_U$.

That is, a variation in the square-wave signal $P_U$ is passed along to the signal $M_U$ only when the signals FBU1 and FBU2 are both at a high level; otherwise, any variation in the square-wave signal $P_U$, as caused by noise or the like, is masked by the gate circuit 2, and thus is not passed along to the signal $M_U$. The periods in which a variation in the square-wave signal $P_U$ is passed along through the gate circuit 2 to the signal $M_U$ are, for example, as indicated by hatching 30 and 31. These periods each last for one sixth of the cycle of the signal $M_U$, and are repeated so as to include a level-shift point of the signal $P_U$ each. On the other hand, in the periods between those periods, the signal $M_U$ is kept at the level at which it is set after a level-shift point of the signal $P_U$.

Similarly, the gate circuit 3 controls passage of the square-wave signal $P_V$ in accordance with the signals FBV1 and FBV2 output from the selector circuit 9 in such a way that a variation in the square-wave signal $P_V$ is passed along to the signal $M_V$ only when the signals FBV1 and FBV2 are both at a high level.

Moreover, the gate circuit 4 controls passage of the square-wave signal $P_W$ in accordance with the signals FBW1 and FBW2 output from the selector circuit 9 in such a way that a variation in the square-wave signal $P_W$ is passed along to the signal $M_W$ only when the signals FBW1 and FBW2 are both at a high level.

Figure 3:
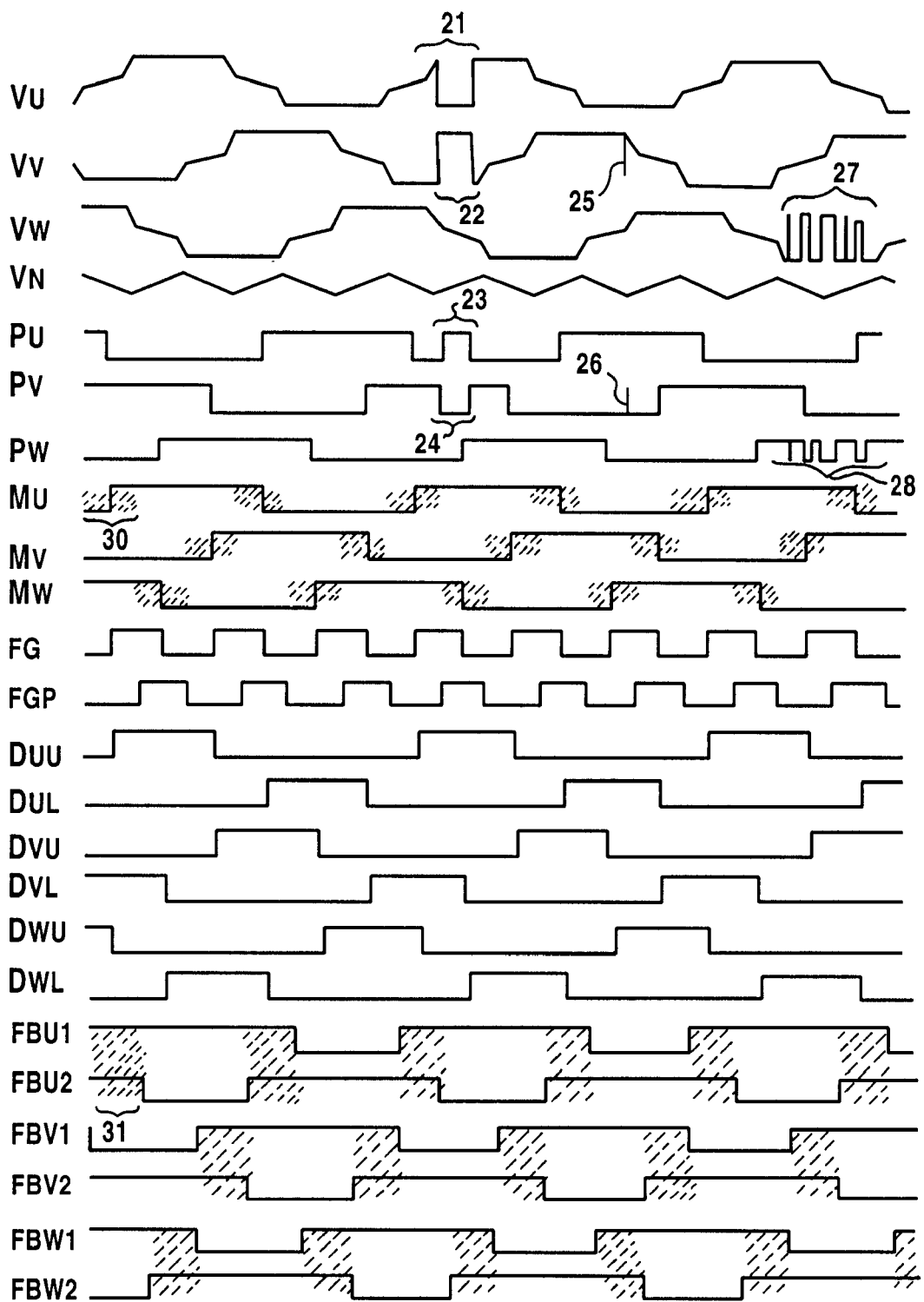
FIG. 3 is a waveform diagram of the signals observed at various points therein.

The periods in which a variation in the square-wave signals $P_V$ and $P_W$ is passed along through the gate circuits 3 and 4 to the signal $M_V$ and $M_W$, respectively, are also indicated by hatching in FIG. 3. In this way, for each of the signals $M_U$, $M_V$, and $M_W$, the periods indicated by hatching occur with one third of the cycle of the back electromotive forces in such a way as not to overlap among the signals $M_U$, $M_V$, and $M_W$.

Now, for example, suppose that, at the moment when the drive signal $D_{UL}$ causes a transistor provided within the power transistor circuit 6 (see FIG. 1) to be turned from an on state to an off state, pulse-like noise 25 appears in the back electromotive force $V_V$, and accordingly noise 26 appears in the signal $P_V$. Even in this case, no noise appears in the signal $M_V$ because it has been subjected to masking as described above. Therefore, the noise 25 does not affect generation of the FG signal or the drive signals $D_{UU}$, $D_{UL}$, $D_{VU}$, $D_{VL}$, $D_{WU}$, and $D_{WL}$, and thus does not cause unstable rotation of the motor 10 (see FIG. 1).

The power transistors provided within the power transistor circuit 6 operate in accordance with the phase signal FGP and thus with a 30-degree phase difference from the drive signals $D_{UU}$, $D_{UL}$, $D_{VU}$, $D_{VL}$, $D_{WU}$, and $D_{WL}$, and accordingly the back electromotive forces $V_U$, $V_V$, and $V_W$ are induced with a 30-degree phase difference from the drive signals $D_{UU}$, $D_{UL}$, $D_{VU}$, $D_{VL}$, $D_{WU}$, and $D_{WL}$. Similarly, noise appears also at the moment when other transistors than those mentioned just above are turned from an on state to an off state; however, masking prevents also such noise from being passed along to the signals $M_U$, $M_V$, and $M_W$.

Moreover, even if noise as indicated by reference numeral 27 appears in the back electromotive force $V_W$ as a result of randomly occurring external disturbance, the noise is passed along to the signal $P_W$, but is not passed along to the signal $M_W$ except in the periods in which the signals FBW1 and FBW2 are both at a high level (i.e. the periods indicated by hatching in the figure). Thus, it is also possible to prevent external disturbance from affecting the drive signals $D_{UU}$, $D_{UL}$, $D_{VU}$, $D_{VL}$, $D_{WU}$, and $D_{WL}$.

Note that the periods indicated by hatching in FIG. 3 include time points at which the values of the voltages of the back electromotive forces $V_U$, $V_V$, and $V_W$ cross the value of the common-terminal voltage $V_N$. By detecting such time points, the rotor position of the motor 10 is recognized to produce the FG signal and the drive signals $D_{UU}$, $D_{UL}$, $D_{VU}$, $D_{VL}$, $D_{WU}$, and $D_{WL}$. Therefore, in these periods, variations in the individual three-phase square-wave signals $P_U$, $P_V$, and $P_W$ need to be passed along to the signals $M_U$, $M_V$, and $M_W$, and thus no masking is performed. In these periods indicated by hatching, the square-wave signals $P_U$, $P_V$, and $P_W$ turn from a high level to a low level or from a low level to a high level.

As described above, in this embodiment, the masking circuits 2 to 4 and 9 mask disturbances in waveforms caused by noise or the like, so that the signals $M_U$, $M_V$, and $M_W$, which have been subjected to masking, are fed to the drive waveform synthesizing circuit 5 and the FG circuit 7. This makes it possible to obtain stable waveforms in the FG signal and the drive signals $D_{UU}$, $D_{UL}$, $D_{VU}$, $D_{VL}$, $D_{WU}$m, and $D_{WL}$, without using an external sensor, and thereby achieve stable rotation of the motor 10.

The power transistor circuit 6 may be provided separately from the IC 11. This makes it possible to drive a larger-sized motor 10. The driving device of this embodiment can be used also to achieve stable rotation with a motor that is so configured as to obtain an FG signal by the use of an external sensor such as a Hall sensor.

INDUSTRIAL APPLICABILITY

As described heretofore, according to the present invention, masking is performed by a selector circuit and gate circuits, and therefore it is possible to prevent braking or noise from making the rotation of a motor unstable, and thereby enhance rotation characteristics. Moreover, a stable FG signal can be produced without using an external sensor, and therefore it is possible to reduce mount surface area, and thereby reduce costs. Thus, a driving device according to the present invention can be suitably used as a driving device for a three-phase brushless motor for use in a VCR or portable MD apparatus.

What is claimed is:

1. A three-phase brushless motor driving device for supplying a three-phase brushless motor with three-phase drive currents that differ in phase by 120 degrees from one another, wherein passage control means is provided that compares back electromotive forces appearing in three coils provided one for each phase in the three-phase brushless motor individually with a common-terminal voltage of the three coils and includes gate circuits that mask the comparison outputs individually in such a way that each of the comparison outputs is, in a predetermined short period including a level-shift point thereof, permitted to pass through the gate circuit intact when the gate circuit receives two control signals that are high from a control section of the passage control means and is, in a period between one such predetermined period and a next such predetermined period, kept at a level at which it is set after the level-shift point, and wherein the drive currents are produced by current supply means in accordance with signals resulting from passage control.

2. A three-phase brushless motor driving device for supplying a three-phase brushless motor with drive currents, comprising:

a comparator circuit for comparing back electromotive forces appearing in three coils provided one for each phase in the three-phase brushless motor individually with a common-terminal voltage of the three coils to produce square-wave signals;

gate circuits for controlling passage of the square-wave signals individually;

a drive waveform synthesizing circuit for synthesizing together outputs of the gate circuits to produce drive signals;

an FG circuit for producing a speed signal from the outputs of the gate circuits;

a phase shifting circuit for producing from the speed signal a phase signal having a phase shifted by 30 degrees relative to the speed signal;

a current supply circuit for supplying the drive currents to the three-phase brushless motor in accordance with the drive signals and the phase signal; and a selector circuit for feeding a select signal back to the gate circuits in accordance with the drive signals and the phase signal, wherein the gate circuits allow passage of the square-wave signals individually only in a predetermined period, and wherein the square-wave signals turn from a high level to a low level or from a low level to a high level individually in the predetermined period.

3. A three-phase brushless motor driving device as claimed in claim 2, wherein the driving device is formed as an integrated circuit.

* * * * *